Oct. 8, 1940.    R. P. STEADMAN ET AL    2,216,787
DOUGH TWISTER
Filed Nov. 20, 1939    6 Sheets-Sheet 2
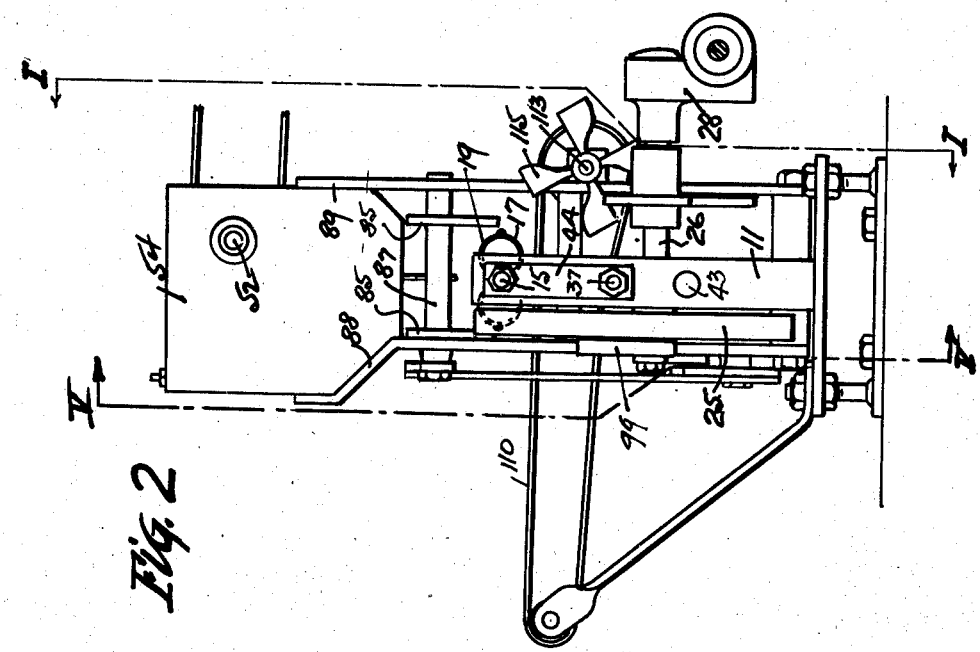
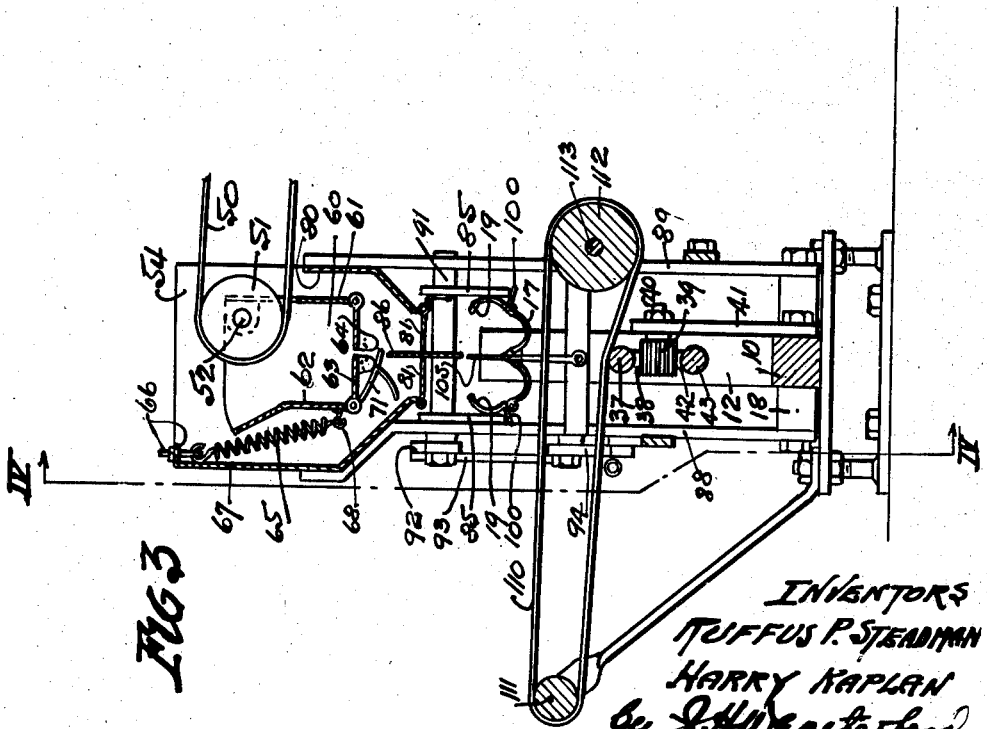
INVENTORS
RUFFUS P. STEADMAN
HARRY KAPLAN

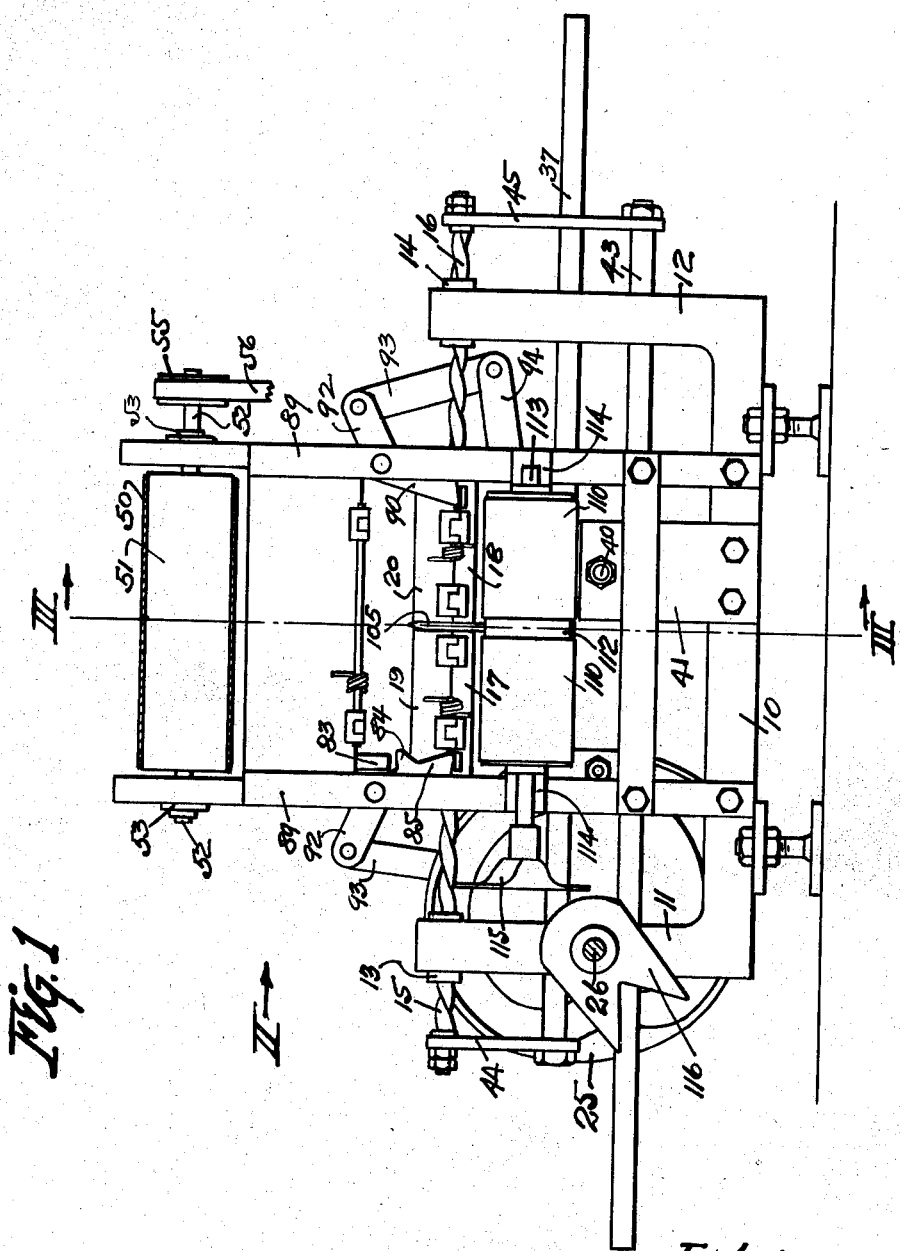

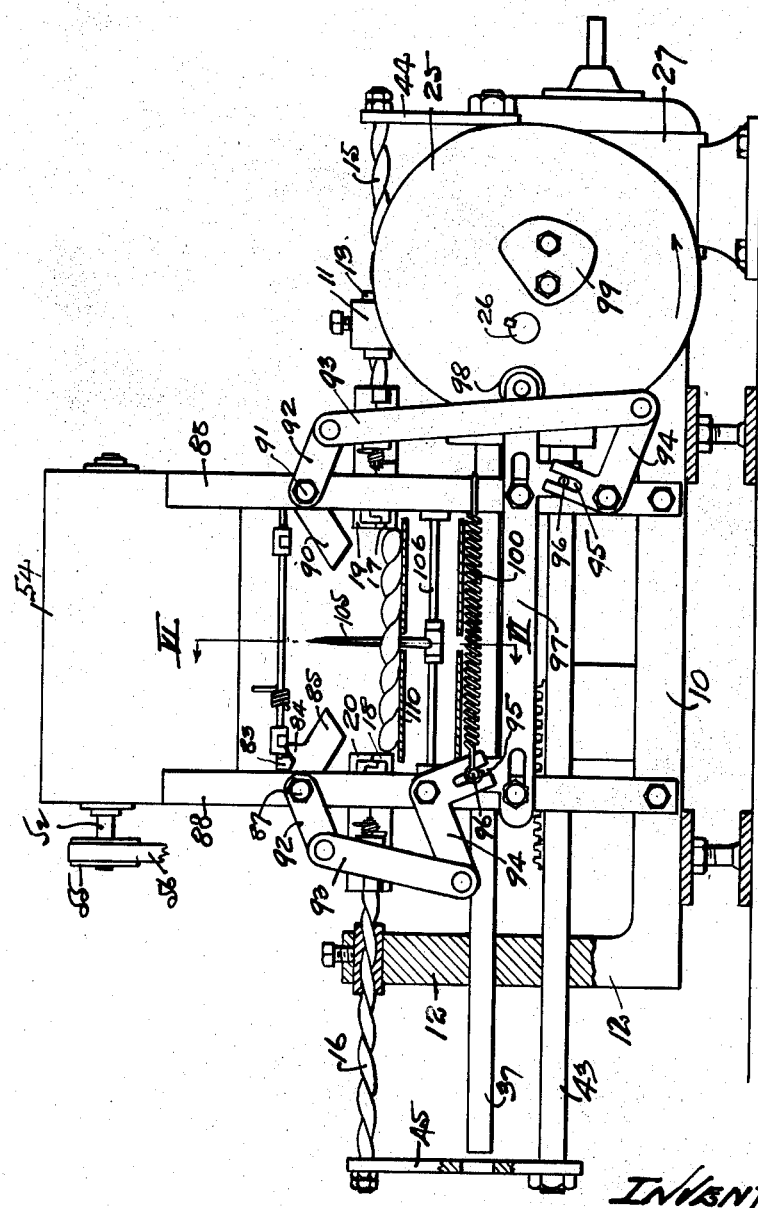

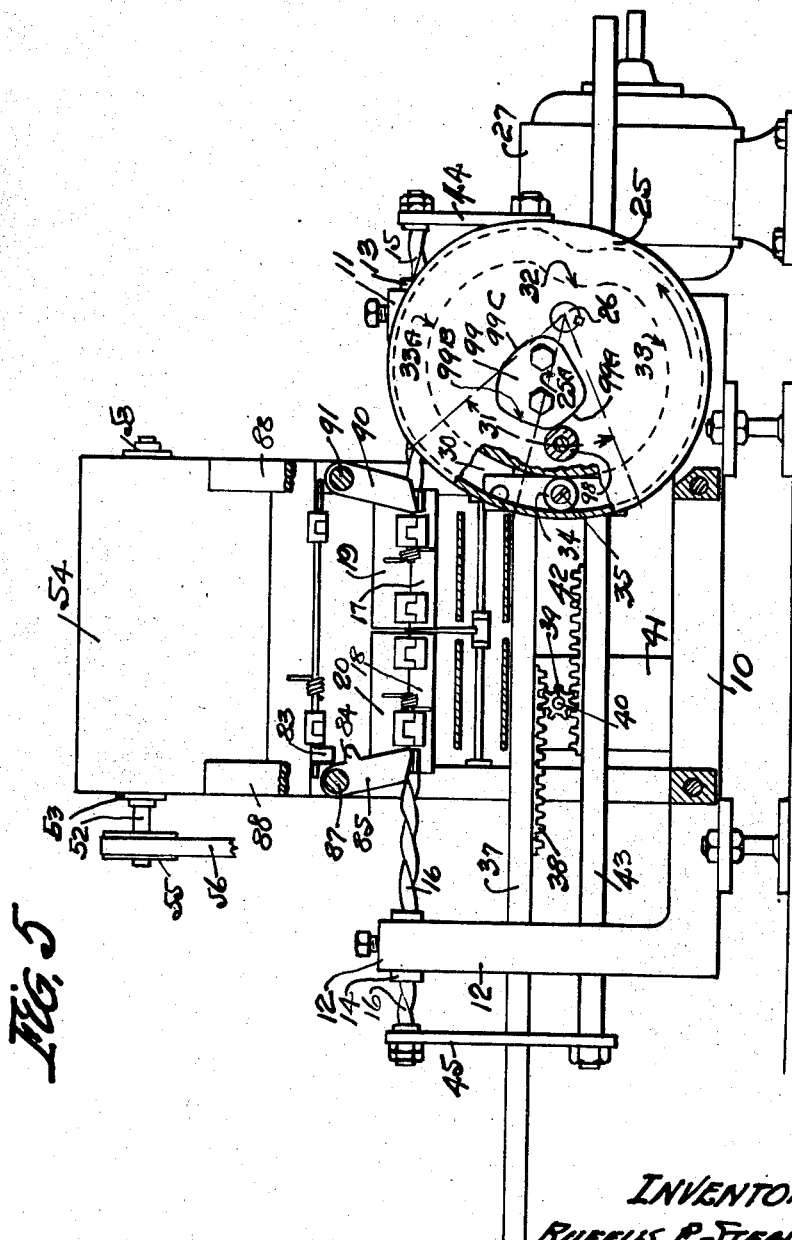

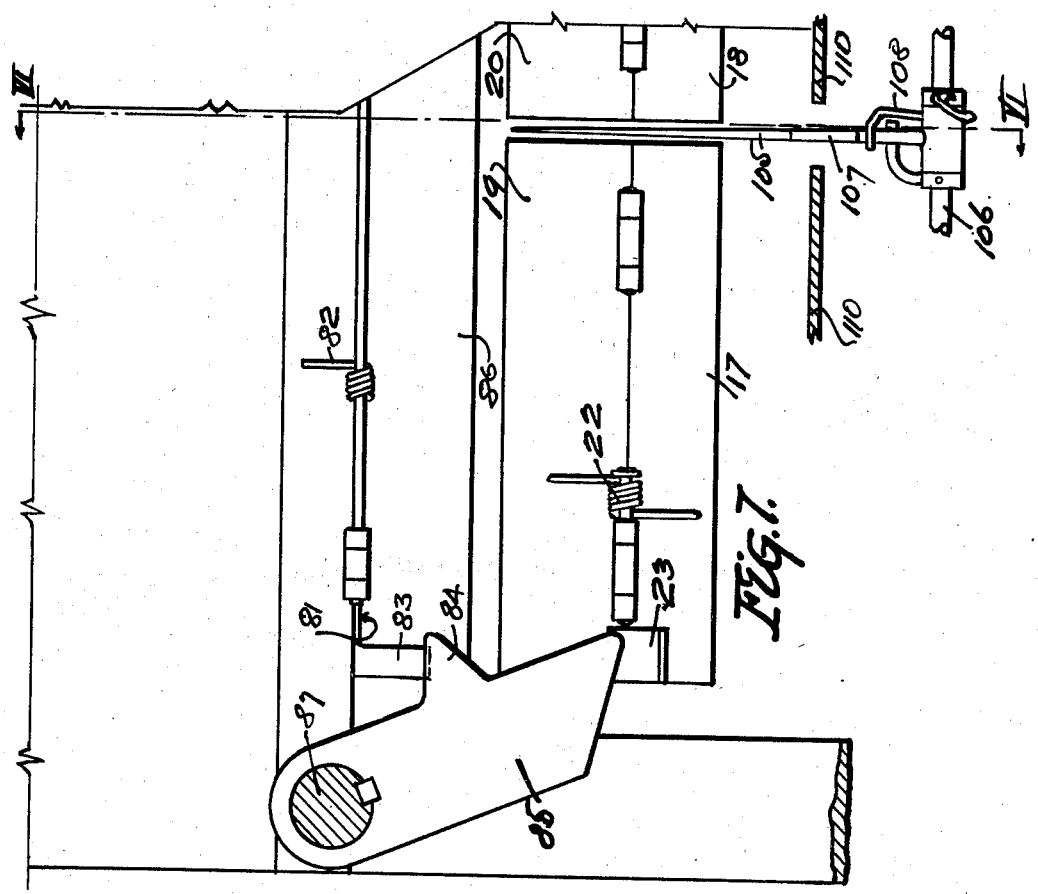
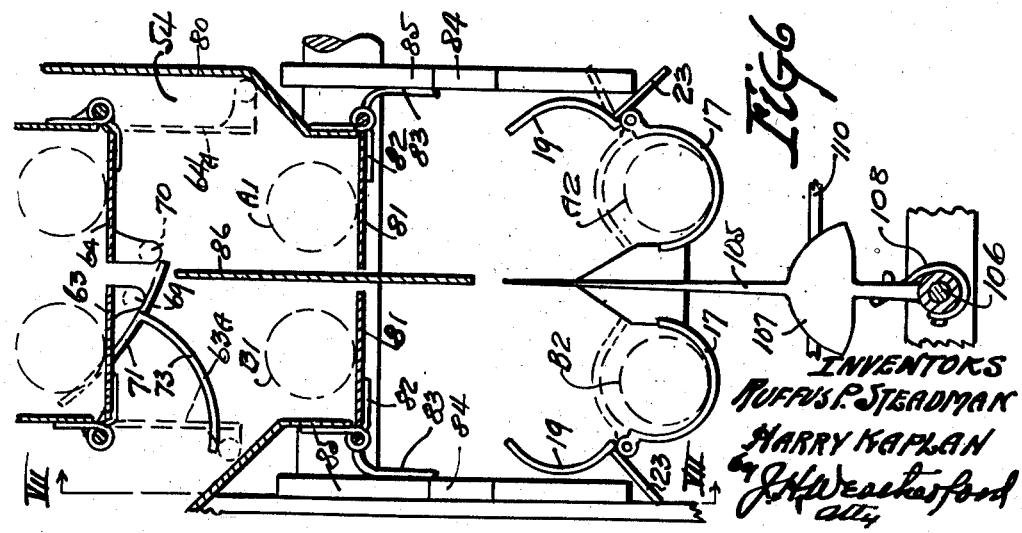

Oct. 8, 1940.  R. P. STEADMAN ET AL  2,216,787
DOUGH TWISTER
Filed Nov. 20, 1939  6 Sheets-Sheet 6
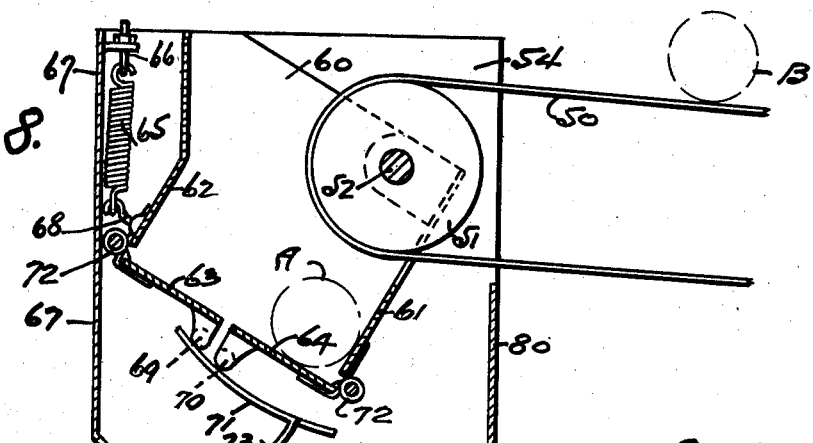
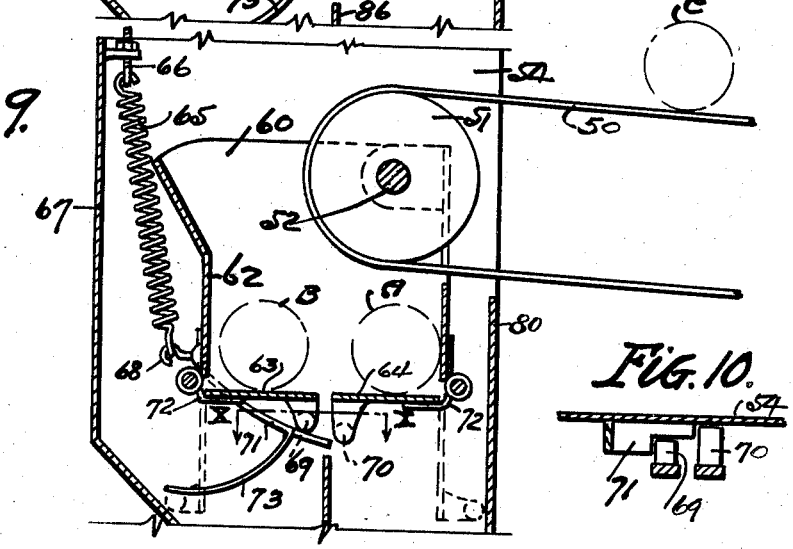
INVENTORS
RUFFUS P. STEADMAN
HARRY KAPLAN
By J. H. Weatherford
Atty.

Patented Oct. 8, 1940

2,216,787

UNITED STATES PATENT OFFICE 2,216,787

DOUGH TWISTER

Ruffus P. Steadman and Harry Kaplan, Memphis, Tenn.

Application November 20, 1939, Serial No. 305,262

7 Claims. (Cl. 107—8)

This invention relates to improvements in the art of preparing dough for baking.

Where dough is shaped into batches and allowed to rise preparatory to baking and is then baked it is often found that the texture of the resulting bread is not pleasing to the customer. It has been found, however, that two strips of dough which have been twisted together, allowed to rise and then baked produces a loaf having a texture very pleasing to the customer. For some time, therefore, it has been customary to make two substantially cylindrical strips of dough and to twist these together by hand for the purpose set out above, and it has been increasingly evident that mechanical means should be adopted for the purpose of doing this twisting.

Responsive to this demand machines have been proposed or made for this purpose. So far as is known, however, these machines have been deficient in numerous items which have hampered or even prevented their adoption.

The objects of the present device are:

To make a machine which will accomplish the twisting together of two strips of dough in a simple, economical and effective manner.

A particular object is to make a twisting apparatus which will properly hold the strips during twisting and will properly accomplish the release of the twisted roll at the end of the twisting operation.

To make a twisting apparatus which will accomplish the twisting of the strips without substantial stretching during twisting, and without forming hardened ends due to clamping of either or both thereof.

To provide a dough twisting mechanism which will evenly twist the two end portions of the roll and complete the twist substantially to the end of such portions.

To provide an apparatus of this kind which will coordinate the movement of twisting heads in such manner that they will be disposed to receive strips of dough, with timing mechanism for delivering the strips, and will subsequently close the heads, rotate and move same apart to accomplish twisting and release of the twisted roll.

The means by which the foregoing and other objects are accomplished and the method of their accomplishment will readily be understood from the following specification on reference to the accompanying drawings in which:

Fig. 1 is a side elevation taken as on the line I—I of Fig. 2, the twister heads being shown approached and open.

Fig. 2 is an end elevation looking in the direction of the arrow 2 of Fig. 1, the twister heads being shown closed.

Fig. 3 is a sectional elevation taken on the line III—III of Fig. 1, the twister heads being shown open.

Fig. 4 is a sectional side elevation taken as on the line IV—IV of Fig. 3, showing the twister heads withdrawn and a twisted roll dropped therefrom.

Fig. 5 is a sectional elevation taken on the line V—V of Figs. 2 and 3, particularly showing the timing cam.

Fig. 6 is an enlarged section taken on the line VI—VI of Figs. 4 and 7, showing the hopper and twisting head relation.

Fig. 7 is a fragmentary side elevation taken on the line VII—VII of Fig. 6 showing the same parts.

Figs. 8 and 9 are enlarged views showing detail of the sorting hopper in differing positions; and Fig. 10 a fragmentary detail taken on the line X—X of Fig. 9.

The machine includes a frame supported in generally upright position, this frame preferably having a base 10 with vertically extending end members 11 and 12, which carry nuts 13 and 14 respectively through which are reciprocably mounted oppositely disposed screws 15, 16, these screws having a much elongated pitch and being adapted to be rotated by reciprocation. The screws 15 and 16 carry complementary twister heads, each composed of an adjacent pair of parallel troughs, 17, 18 respectively, and a pair of covers, 19, 20, respectively, hinged thereto as by hinges 21, the axes of the troughs and covers being parallel with the extended axes of the screws. 22 are springs which urge closure of the covers, and 23 are ears projecting from these covers. In closed position the covers complete a pair of substantially cylindrical barrels for each of the heads, and in open position allow free access to the troughs.

The screws 15, 16 are reciprocated synchronously but in opposite directions by a cam 25 which preferably is a grooved, double acting cam. The cam is rigidly secured on a shaft 26, which shaft is driven by a motor 27 through suitable reduction gearing, here shown enclosed in a case 28.

As will be most clearly seen in Fig. 5, the cam 25 is substantially symmetrical about an axis 25A and is provided with a groove 30 which is concentric with the shaft 26 through slightly less than 90 degrees of arc, providing a similar dwell which is equally balanced with respect to said axis. Diametrically opposite this dwell at the point 32, the groove momentarily approaches the shaft 26, and from this position the groove enlarges along oppositely disposed spirals 33, 33A to the dwell portion 31, the spiral 33 here functioning as an approach.

Disposed in the groove 30 is a roller 34 which is mounted on a pin 35 carried by a cross-head 36. The cross-head is rigidly secured to a rod 37, reciprocably mounted in the end members 11 and 12. Rigidly secured to the rod 37 is a rack 38 which meshes with a floating pinion 39, journalled on a pin 40 carried by a suitable support 41 extending upward from the base 10. Oppositely, the pinion 39 meshes with a second rack 42 which is mounted on and rigidly secured to a second rod 43, this rod likewise being reciprocably mounted in the end members 11 and 12. The rod 37 carries at one end a rigidly connected bracket 44 in which one end of the screw 15 is journalled. Similarly the rod 43 carries a rigidly secured bracket 45 in which the screw 16 is similarly journalled, the bracket 45 being apertured to permit the free passage of the rod 37.

Disposed above the twister heads 17, 18 is a dough feeding system comprising a delivery belt, a sorting hopper and a timing hopper therebelow. The delivery belt 50 passes around a drum 51 which is mounted on a shaft 52. The drum may be secured to the shaft and the shaft journalled in bearings 53 carried by the end walls 54 of the timing hopper. In such case the drum may be driven as by a pulley 55 through a belt 56 suitably powered. Obviously, however, the delivery belt may be driven from the opposite end if more convenient.

The sorting hopper comprises a generally rectangular structure having ends 60, and sides 61, 62, lying within and adjacent the end walls 54 of the timing hopper, and swung on the shaft 52, the side 62 preferably being flared at the top away from the belt. This hopper is provided with a pair of closure doors 63, 64 suitably hinged to the bottom edges of the sides 61, 62.

65 is a tension spring having one end secured through an adjustable eye bolt 66, as to the flanged top edge of the side 61 of the timing hopper and its opposite end secured as through an eye bolt 68 to the lower edge of the side 62, this spring, as shown in Fig. 8, normally holding the sorting hopper in inclined position to receive the strips A, B, etc., of dough, the first of these strips when delivered by the belt 50 into the hopper swinging the hopper toward upright position prior to the delivery of the second strip thereto, and the accumulated weight of the two strips of dough completing movement of the hopper into substantially upright position. The tension of the screw 65 is adjusted by the adjustable eye bolt 66 to allow the accomplishment of such movement. It will be noted that the adjustment of the bolt 66 is sufficient to permit the proper accomplishment of these movements with various sizes and weights of dough strips.

The doors 63, 64 are respectively provided at their opposite ends with a pair of pins 69, and a pair of pins 70 which slide along arcuate cam surfaces 71 and prevent the opening of the doors until the hopper moves into substantially upright position. The cams 71 are stepped in width of their lower ends, as shown in Fig. 10, and the pins 69 are made shorter than the pins 70 whereby the two doors will be released simultaneously. 72 are springs which are of sufficient strength to accomplish the closing of the doors 63, 64 after discharge of the dough therefrom, but not to support the weight of the dough. In order to prevent the spring 65 from returning the hopper to inclined position, before this closing action of the doors can take place, the cams 71 are preferably provided with downwardly extending arcuate portions 73 with which the pins 69 engage as the door 63 opens and which hold the hopper in upright position until the closing of this door and the door 64 are accomplished.

The timing hopper, in addition to the end wall 54, and side wall 67 has an oppositely disposed side wall 80, both walls extending below the bottom of the gates 63, 64 of the sorting hopper when these gates are in open position, as at 63A, 64A, in Fig. 6. Hingedly attached to the bottom of the side walls 80 are doors 81 which are, when the hopper is empty, held closed by springs 82 of insufficient tension to support the weight of the dough thereon. These doors are provided with outwardly projecting lugs 83 which are adapted to engage end portions 84 of trip levers 85, and which when so engaged hold the doors in closed position. Preferably the timing hopper is provided with a central division wall 86 which insures proper discharge of the dough strips into the twister heads therebelow.

There are two trip levers 85 disposed on opposite sides of the hopper which are rigidly secured to a shaft 87, journalled in two upright members 88, 89 which are carried by the base 10 and extend upward therefrom to support the side walls 67, 80 of the hopper.

At the opposite end of the hopper there are an additional pair of trip levers 90 which are similarly secured to a shaft 91, these latter levers not necessarily being provided with ears. The shafts 87 and 91 have secured on their outer ends, arms 92 which are connected through links 93 with bell crank levers 94. These levers have each a forked end 95, which forked ends engage pins 96. The pins 96 project from a reciprocable member 97 which is slidably supported by the upright members 88. The member 97 extends toward alinement with the axis of the shaft 26, and carries on its outer end a roller 98 which is adapted for engagement with and displacement by an auxiliary cam 99 secured to and moving with the cam 25, this cam 99 having an approach 99A, a dwell 99B, and an abrupt run-off portion 99C. These approach and dwell portions are jointly, substantially equally balanced with reference to the axis 25A of the cam 25, but of slightly less total extent than the dwell 31 of such cam. The approach 99A engages the roller 98 and moves it away from the shaft 26, in doing this raising the outer ends of the arms 92 and correspondingly depressing the ends of the trip levers 85—90. A tension spring 100, acting on one of the bell crank levers 94, accomplishes quick return movement of the levers when released by the cam.

The covers 19 and 20 of the twister troughs are provided with ears 23 which extend rigidly outward from such covers into the path of the trip levers 85—90, and which, when these levers are shifted by the action of the cam 99, move the covers of the twister troughs into open position and hold them in such open position throughout the dwell of the cam 99.

105 is a spear or needle having its lower end disposed well below the twister heads, this lower end being supported as by a rod 106 to allow swinging movement of the needle in a plane at right angles to the axis of the twister heads. The upper end of the needle extends above the tops of the twister heads. 107 is a dough support rigidly secured on the needle and below the twister heads. The needle is urged into upright position as by a spring 108.

Disposed on opposite sides of the needle are a pair of belts 110, which belts are carried at one end by a roller 111, and oppositely by a roller 112, the belts being driven by the roller 112. The roller 112 is mounted on a shaft 113 suitably journalled in bearings 114 carried by the upright members 89. One end of the shaft 113 extends beyond the bearing and carries a star wheel 115, the prongs of which are engaged by a complementary trip 116 carried by the cam shaft 26, this trip imparting a step by step movement to the star wheel 115 and correspondingly advancing the belts with a similar step by step movement. The belts are spaced apart to allow free swinging movement of the needle 105 and the dough support 107 thereon as the twisted dough roll is shifted by movement of the belts.

In using the device the dough is formed into elongated cylindrical strips in usual manner by a machine which delivers the strips at substantially even intervals to the belt 50, by which their transfer to the sorting hopper is accomplished, the sorting hopper initially being in the position shown in Fig. 8. In that figure a strip of dough A has just been delivered to the sorting hopper and rests on the door 64 and against the wall 61, and a second strip of dough B is approaching on the belt. The weight of the strip of dough A swings the hopper downward around the shaft 52 towards upright position and subsequently the belt delivers the second strip B into the hopper, the weight of the two strips A and B moving the hopper into upright position, as shown in Fig. 9.

Until the hopper reaches substantially upright position the cams 71 prevent the doors opening, but as the hopper reaches the vertical position shown, these doors are released and are free to drop the two dough strips into the timing hopper where they are supported in the positions A1, B1 until the doors 81 are released by the action of the trip levers 85.

After release of the strips A, B, from the hopper, the pin 69, cooperating with the cam 73, hold the hopper in vertical position until the springs 72 close the doors, after which the spring 65 swings the hopper to initial position.

During movement of the dough strips into the sorting hopper, and from this hopper into the timing hopper, and subsequently, the motor 27 turns the cam 25 reciprocating the screws 15 and 16 in opposite directions, this movement alternately moving the twister heads 17 and 18 apart and together and rotating them in timed sequence.

In Fig. 4 the twister heads are shown substantially their maximum distance apart. As the cam 25 turns in the direction of the arrow, the spiral portion 33 of the groove 30 moves the roller 34 to the left, as shown in Figs. 4 and 5, and through the rod 36 correspondingly shifts the rod 37. The rack 38 on this rod turns the pinion 40 and oppositely shifts the rack 42 and the rod 43 on which it is mounted. These movements, acting through the brackets 44 and 45, cause the screws 15 and 16 to approach the twister heads 17 and 18 toward each other, at the same time rotating them. This approach movement continues until the dwell 31 of the cam is reached, during which dwell the heads remain stationary. The nuts 13 and 14 through which the screws 15, 16 move have previously been so turned and adjusted that the two heads during the dwell period are positioned with their barrels in the same horizontal plane, with the trough portions of the barrels opening upward.

As motion of the heads cease the approach portion 99A of the cam 99 shifts the roller 98 rapidly to the left and through the bell crank levers 94, links 93 and arms 92 swings the trip levers 85 and 90 downward into engagement with the ears 100 of the barrel covers 19 and 20, this movement swinging these covers toward fully open position. As this position is reached the ears 34 of the trip levers 85 disengage from the lugs 83 and permit the weight of the rolls A1, B1 of dough to swing the doors 81 open and these rolls of dough to drop into the troughs 17, 18 of the head. During these movements the dwell 99B of the cam 99 holds the doors open, but as the movement of the cam continues it moves away from the roller 98 allowing the trip levers to be snapped rapidly to initial position by action of the spring and the covers 19 and 20 thus released to be closed by action of the springs. Following the closure of these covers the cam 25 reaches the end of its dwell and movement apart of the screws 15 and 16 is begun.

The strips of dough dropping into the troughs 17, 18 lie on opposite sides of the needle 105 which projects well above their tops, and as the heads move apart their opposite ends are oppositely rotated by action of the screws 15 and 16 and even twisting together of the ends is compelled. The needle 105 also prevents any longitudinal shifting of the strips of dough as twisting is being accomplished so that both twister heads reach their respective opposite ends of the twisted roll at the same time. During twisting the heads move directly apart in synchronized relation to the amount of twisting and the heads slip readily off the dough as they move apart so that a minimum amount of distortion or compression is put upon the strips of dough and each completed twisted roll is accurately and uniformly twisted throughout. The twisted roll drops from the twister heads onto the belts and is shifted by movement of these belts from beneath the heads. In this movement the needle turns about the rod 106 toward a horizontal position and is withdrawn from the twisted roll by movement of the roll away therefrom.

We claim:

1. In a dough twisting machine, a pair of dough twisting heads in substantially axial alinement, each said head comprising a pair of parallel troughs, and a pair of covers for said troughs respectively hinged thereto, each said cover and trough forming a substantially cylindrical barrel when said covers are closed, means for approaching said heads axially each toward the other, means for stopping and holding said heads when in approached position during a predetermined dwell period with said troughs facing vertically upward, means coordinated to open said covers to permit access from above to said troughs and for subsequently releasing and closing said covers, during said dwell period, and means for relatively separating said heads and for accomplishing opposite turning motion thereof during separating movement.

2. In a dough twisting machine, a pair of dough twisting heads in substantially axial alinement, each said head comprising a pair of parallel troughs, and a pair of covers for said troughs respectively hinged thereto, each said cover and trough forming a substantially cylindrical barrel when said covers are closed, means for reciprocating said heads, to alternately approach, said heads axially each toward the other and to separate same, means for stopping and holding said heads when in approached position with said troughs facing vertically upward during a predetermined dwell period, means coordinated with said reciprocating means to open and close said covers during said dwell period, and permit access from above to said troughs during a portion of said period, means for accomplishing rotational movement of said heads in relatively opposite directions during said reciprocating movement.

3. In a dough twisting machine, a pair of dough twisting heads in substantially axial alinement, each said head comprising a pair of parallel troughs, and a pair of covers for said troughs respectively hinged thereto, means, including a rotating cam, a co-acting roller and linkage connecting said roller and said heads, for reciprocating said heads, to alternately approach and separate said heads axially and rotate same in opposite directions, said cam having a cylindrical dwell portion for stopping movement of said roller and holding said heads, when in approached position with said troughs facing vertically upward, during a predetermined period; means for opening and closing said covers during said period, including a second cam secured to and rotating with said first cam, a co-acting roller, and linkage connecting said roller and said covers, said second cam having an actuating portion and a dwell portion, having a total arcuate length less than the arcuate length of said first cam dwell portion, and being timed to act within the dwell period of said first cam.

4. A dough twisting machine including two pairs of troughs in axial alinement, means for moving said trough pairs axially into end adjacency with said troughs facing upright, and for holding said troughs upright and in such adjacency during a predetermined dwell period to receive rolls of dough for twisting, a needle-shaped member, means hingedly mounting said member to extend vertically upward across said axis, between said trough ends, said member being adapted to lie between said dough rolls and establish a central anchorage therefor, means urging said member into such position, means for subsequently during said dwell period covering said troughs to form tubular barrels, means for revolving and concurrently separating one pair of said barrels from the other thereof and for releasing the twisted roll of dough thus formed from said barrels, and means for transferring said roll laterally and disengaging said needle member.

5. A dough twisting machine including two pairs of troughs in axial alinement, means for moving said trough pairs axially into end adjacency with said troughs facing upright, and for holding said troughs in such adjacency during a predetermined dwell period, to receive strips of dough for twisting, laterally movable means disposed between said trough ends in substantially vertical position crossing said axis, and adapted to lie between said strips and prevent substantial end shift of said dough and central twisting movement thereof, means for subsequently and during said period covering said troughs to form tubular barrels, means for revolving and concurrently separating one pair of said barrels from the other thereof and for releasing the twisted roll of dough thus formed from said barrels, and means for shifting said roll laterally to disengage it from said movable means and remove it.

6. A dough twisting machine, including a pair of dough twisting heads substantially in axial alinement, each said head including a pair of parallel troughs, means for reciprocating said heads, to alternately approach, said heads axially each toward the other and to separate same, means for accomplishing relatively opposite rotation of said heads during said reciprocating movement, means for stopping and holding said heads when in approached position with said troughs facing vertically upward during a predetermined dwell period to receive strips of dough for twisting, means for subsequently during said period covering said troughs to establish twisting barrels, and means for substantially preventing longitudinal or rotational movement of the mid portion of said strips during rotational and separating movement of said heads.

7. In a dough twisting machine, a pair of heads in axial alinement, means for approaching said heads into end adjacency, and for withdrawing and relatively oppositely turning said heads, means disposed between said heads and substantially on the axial center line thereof, for resisting rotational movement of the mid points and longitudinal displacement of strips of dough placed in said heads for twisting.

RUFFUS P. STEADMAN.
HARRY KAPLAN.